United States Patent
Pryor et al.

(10) Patent No.: US 12,388,098 B2
(45) Date of Patent: Aug. 12, 2025

(54) CONTROLLING CATHODE STOICHIOMETRY IN FUEL CELLS

(71) Applicant: Ford Global Technologies, LLC, Dearborn, MI (US)

(72) Inventors: Martin Dale Pryor, Canton, MI (US); Patrick J. Ford, Livonia, MI (US); Craig Michael Mathie, White Lake Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 687 days.

(21) Appl. No.: 17/676,390

(22) Filed: Feb. 21, 2022

(65) Prior Publication Data

US 2023/0268528 A1    Aug. 24, 2023

(51) Int. Cl.
*H01M 8/04*       (2016.01)
*H01M 8/0438*     (2016.01)

(52) U.S. Cl.
CPC ... *H01M 8/04395* (2013.01); *H01M 8/04425* (2013.01); *H01M 2250/20* (2013.01)

(58) Field of Classification Search
CPC ......... H01M 8/04395; H01M 8/04425; H01M 2250/20
USPC .......................................................... 429/428
See application file for complete search history.

(56) References Cited

U.S. PATENT DOCUMENTS

| | | | |
|---|---|---|---|
| 6,461,751 B1 * | 10/2002 | Boehm ............. | H01M 8/04089 429/432 |
| 6,887,606 B2 | 5/2005 | Parr et al. | |
| 8,394,542 B2 | 3/2013 | Elwart et al. | |
| 8,623,559 B2 | 1/2014 | Frahm et al. | |
| 2003/0224231 A1 * | 12/2003 | Penev ............... | H01M 8/04089 429/423 |
| 2005/0164048 A1 * | 7/2005 | Wheat ............... | H01M 8/04559 429/444 |
| 2007/0082235 A1 * | 4/2007 | Sinha ................ | H01M 8/04753 429/430 |
| 2008/0014478 A1 * | 1/2008 | Tighe ................ | H01M 8/04089 429/444 |
| 2018/0026278 A1 * | 1/2018 | Kwon ............... | H01M 8/04097 429/415 |
| 2019/0148747 A1 * | 5/2019 | Yamamori ........ | H01M 8/04552 429/429 |

FOREIGN PATENT DOCUMENTS

TW        1424956 B        2/2014

* cited by examiner

*Primary Examiner* — James M Erwin
(74) *Attorney, Agent, or Firm* — David B Kelley; Brooks Kushman P.C.

(57) ABSTRACT

Systems and methods for managing cathode stoichiometry of an electrochemical cell are disclosed. A system may include a fuel cell, a compressor for supplying air to the fuel cell and an oxygen sensor proximate to or downstream of an outlet of a cathode chamber of the fuel cell. An operation speed of the compressor or flow rate of the air may be adjusted by, for example, a controller after receiving data from the sensor regarding the amount of residual oxygen. For example, the operation speed/flow rate may be increased or decreased to achieve a cathode stoichiometry of about 1.00.

19 Claims, 2 Drawing Sheets

CONTROLLING CATHODE STOICHIOMETRY IN FUEL CELLS

TECHNICAL FIELD

The instant disclosure relates to fuel cells and more specifically, managing fuel cell reactant supplies.

BACKGROUND

Fuel cells are a source of energy that may be used to power electric machines such as in vehicles. Fuel cells often rely on reactions between readily available materials such as hydrogen and oxygen.

SUMMARY

A power system including a fuel cell, a compressor, and an oxidant sensor is disclosed. The fuel cell may define a cathode chamber housing a cathode and an anode chamber housing an anode. An electrolyte may be disposed between and in contact with the cathode and anode. The fuel cell also defines an inlet and an outlet providing fluid communication to the cathode chamber. The compressor is configured to provide an oxidant such as oxygen to the cathode chamber. The oxidant sensor is disposed proximate to or downstream from the outlet such that it provides data corresponding to a residual amount of oxidant.

A vehicle power system including a fuel cell, an air intake system, an exhaust system and a controller is disclosed. The fuel cell includes a cathode passage adjacent to a cathode. The passage defines an inlet and an outlet such that the cathode passage is in fluid communication with the intake system and the exhaust system via the inlet and outlet respectively. The air intake system includes an airflow inducing device such as a compressor configured to provide an airflow to the fuel cell during operation. The exhaust system includes an oxygen sensor that senses or detects a residual amount of oxygen. The controller is configured to initiate a command to supply oxygen to the fuel cell. The command may maintain an operation speed of the airflow inducing device or flow rate of the oxygen in response to the residual amount of oxygen being within a predetermined range and may adjust the operation speed/flow rate in response to the residual amount of oxygen being outside the predetermined range.

A method of controlling operation of an electrochemical cell such as a fuel cell is disclosed. The method may include providing an oxidant such as air to a fuel cell at a flow rate. The flow rate may be maintained in response to the residual amount of oxidant from the fuel cell exhaust being more than a lower threshold amount. The flow rate may also be increased in response to the residual amount of oxidant being less than a lower threshold amount.

DETAILED DESCRIPTION

Figure 1:
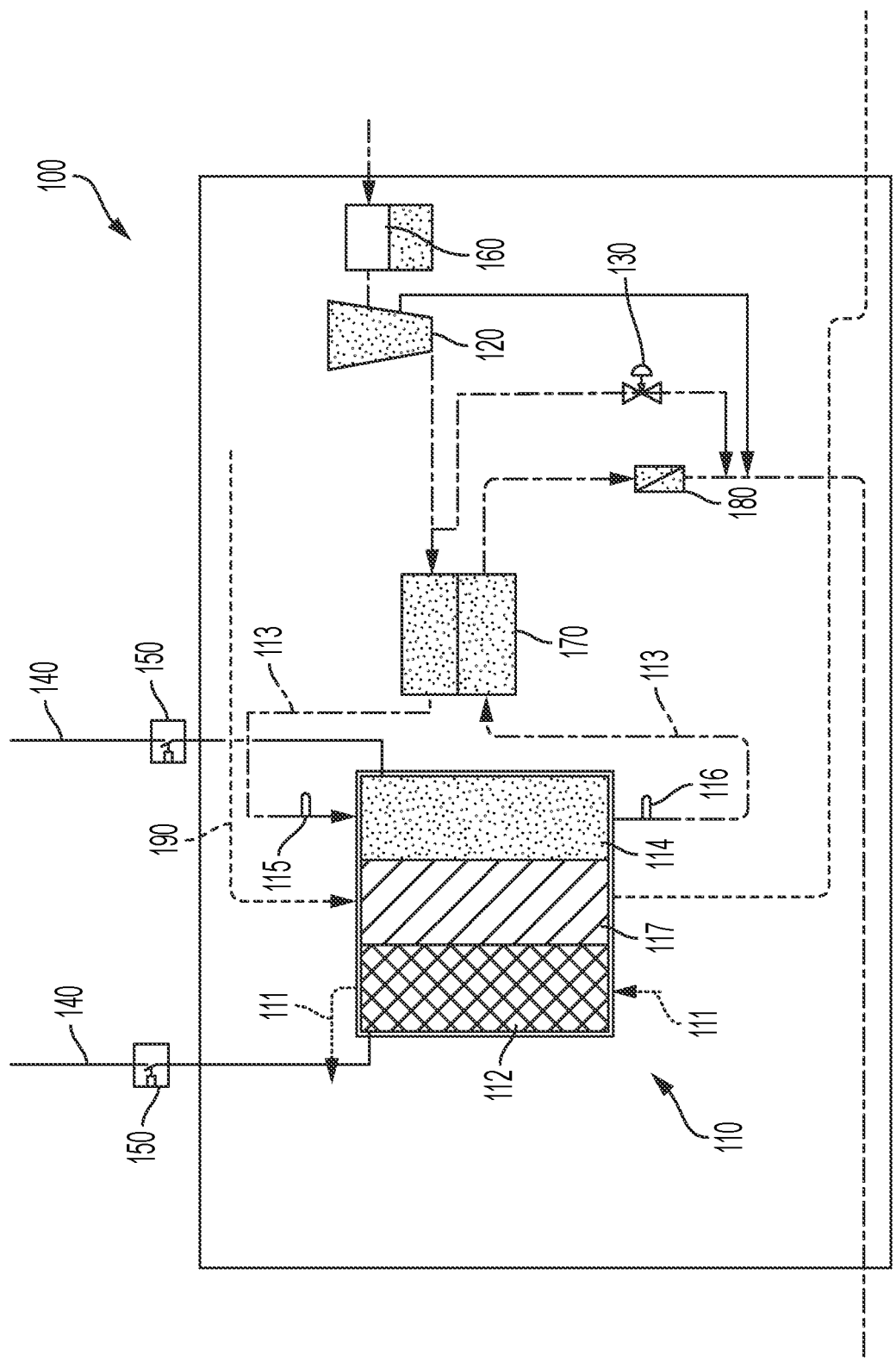
FIG. 1 is a schematic of a power system.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. A description of constituents in chemical terms refers to the constituents at the time of addition to any combination specified in the description and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Processes executed by a vehicle system or vehicle computing system located in a vehicle may be discussed herein, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems. In certain embodiments, particular components of the vehicle associated computing system may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more controllers or processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In the illustrative embodiments discussed herein, an exemplary, non-limiting example of a process performable by a computing system may be shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Referring to FIG. 1, a power system 100 is disclosed. The power system 100 may include an electrochemical cell such as a fuel cell 110, a flow inducing device 120 such as a compressor, one or more reactant sensors 115, 116, and a controller. The power system 100 may be configured to control a reactant amount to improve or maximize the efficiency of the fuel cell 110. The power system 100 may be the power system of a vehicle such as a motorcycle, automobile, watercraft, aircraft, or train. The power system may power an electric machine of the vehicle. The fuel cell 110 may have an electric circuit 140 that connects to the electric machine. The circuit 140 may employ one or more electrical contacts 150 that may move from an open position and closed position. While in the closed position and during operation the fuel cell may provide an electrical current to the electric machine.

The fuel cell 110 may include a cathode, an anode, and an electrolyte 117 therebetween. The fuel cell 110 may also define/house a cathode chamber 114 and an anode chamber 112. The cathode may be adjacent to or housed by a cathode chamber 114. The anode may likewise be adjacent to or housed by an anode chamber 112. The chambers 112, 114 may each form a passage 111/113. The fuel cell 110 may also define an inlet and an outlet for each of the chambers 112, 114. The inlet may receive a reactant and the outlet may allow an exhaust gas of the fuel cell 110 to leave the fuel cell 110. The reactants may include an oxidant and a fuel. The oxidant may be provided to the cathode and the fuel may be provided to the anode to carry out chemical (redox) reactions to produce electricity. For example, the oxidant (i.e., an oxidizing agent) may be oxygen ($O_2$) and the fuel may be hydrogen ($H_2$). However, not all the reactant provided to the fuel cell 110 is necessarily used. Instead, a residual amount of reactant may exit the outlet. The ratio of the amount of reactant (e.g., oxygen) to the amount of reactant consumed may be referred to as the cathode stoichiometry. For example, a cathode stoichiometry of 1.00 may be desirable. Alternatively, a higher cathode stoichiometry such as 1.5 may be desirable.

A flow inducing device 120 may be a pump or compressor. The flow inducing device may provide the reactant to the fuel cell 110 during operation. For example, the compressor may provide an airflow to the cathode chamber 114 of the fuel cell 110. The flow inducing device 120 may operate at an operation speed corresponding to a flow rate and/or amount of reactant. In a refinement, the operation speed/flow rate may be adjusted to achieve a cathode stoichiometry between 1.0 to 2.0, or more preferably 1.1 to 1.9, or even more preferably 1.2 to 1.8. In a refinement, the flow inducing device 120 such as a compressor may be include in an air intake system. The air intake system and compressor may be in fluid communication with the cathode chamber 114. The air intake system may further include an air filter 160 disposed upstream of the compressor. The outlet may be in fluid communication with an exhaust system.

The one or more reactant sensors 115, 116 may be disposed proximate to the inlet and/or the outlet. Each sensor may sense or detect data sufficient to determine the amount of reactant. For example, an inlet sensor 115 may measure the amount of oxygen being provided to the fuel cell 110 and/or an outlet sensor 116 may measure the amount of residual oxygen leaving the fuel cell 110. In a refinement, the inlet sensor 115 may be disposed proximate to the inlet and the outlet sensor 116 may be disposed proximate to the outlet. In yet another refinement, the inlet sensor 115 may be disposed upstream of the inlet and/or the outlet sensor 116 may be disposed downstream of the outlet. The one or more sensors 115, 116 may be universal exhaust gas oxygen (UEGO) sensors or an NOx sensor. Many NOx sensors are dual chambered and capable of measuring both oxygen and nitrogen oxides.

The controller may be in communication with the one or more sensors 115, 116 such that the controller may receive data from the one or more sensors 115, 116. The controller may also be in communication with the flow inducing device 120 (e.g., compressor) such that it may adjust the operation speed/flow rate based on the data. In other words, the controller may be programmed to initiate a command to provide reactant to the fuel cell 110. For example, the controller may adjust the operation speed/flow rate of air or oxygen to achieve a predetermined stoichiometry. For instance, the controller may increase the operation speed/flow rate responsive to a residual amount of oxygen being less than a predetermined range and/or a threshold amount. The controller may decrease the operation speed/flow rate responsive to the residual amount of oxygen being more than the predetermined range and/or a (different) threshold amount. Said differently, the operation speed/flow rate may be adjusted based on a residual amount of oxygen being outside the predetermined range and the predetermined range may be defined by a lower threshold amount and an upper threshold amount. It should be understood that in some embodiments and under some circumstances the residual amount of oxidant may be zero and the operation speed of the flow inducing device/flow rate may be increased.

The power system 100 may also include a bypass valve 130, a humidifier 170, a throttle 180, a coolant system 190 or a combination thereof. The bypass valve 130 may assist in performing a hydrogen purge or initiating a hydrogen-protective-state. The bypass valve 130 may provide airflow to the exhaust system without running the gas through the fuel cell 110. This may allow the system to be purged without passing oxygen through the cathode.

Figure 2:
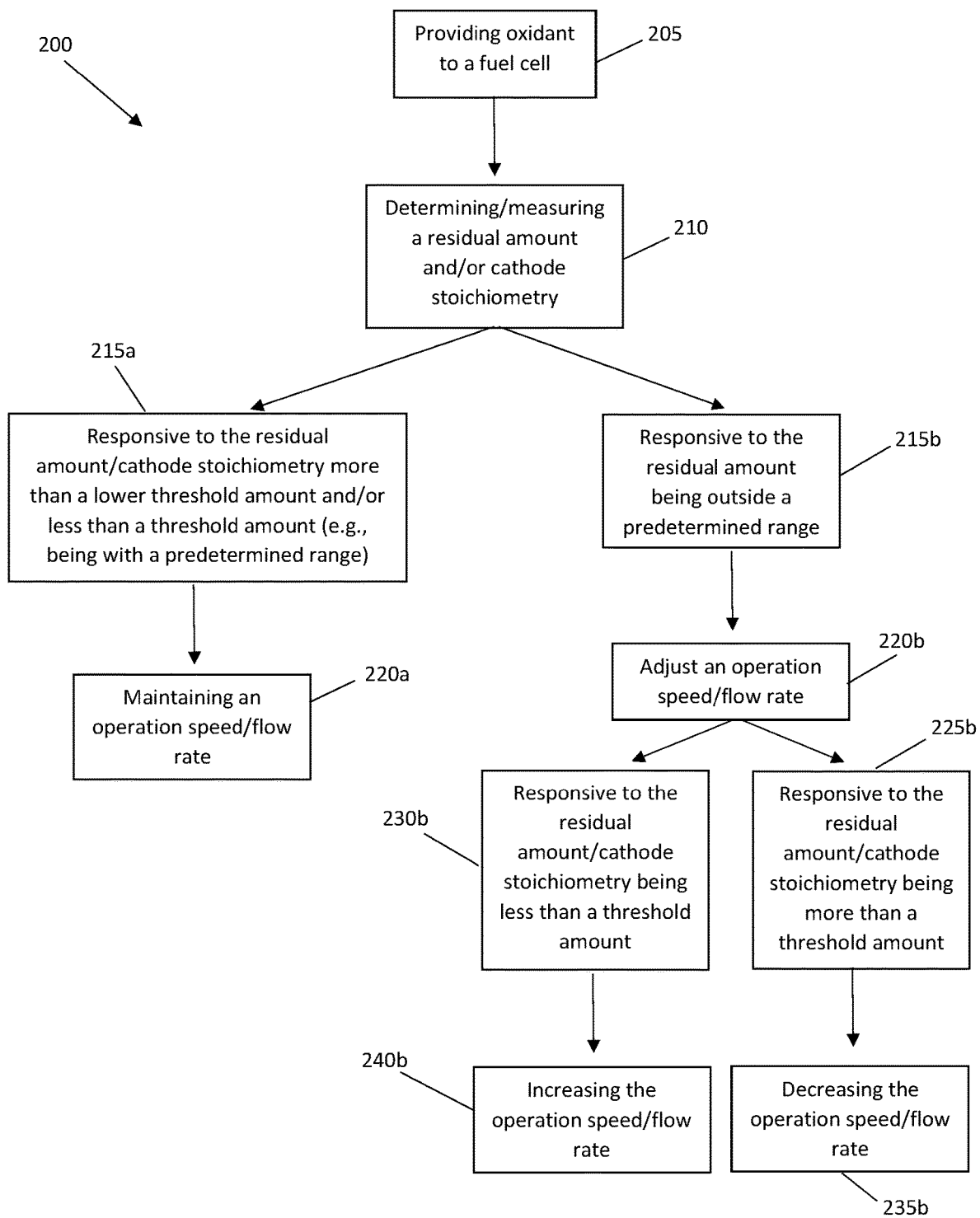
FIG. 2 is a flowchart of a method of managing an electrochemical cell.

A method 200 of controlling the operation of an electrochemical cell is disclosed, as shown in FIG. 2. The method 200 may include providing an oxidant to a fuel cell (i.e., step 205), determining a residual amount of oxygen and/or cathode stoichiometry (i.e., step 210), and maintaining or adjusting the flow rate (i.e., step 220). The oxidant may be provided at a flow rate based on the operation speed of a flow inducing device such as a compressor. The residual amount of oxygen may be determined by obtaining information from one or more sensors such as UEGO sensors. For example, a UEGO sensor may be disposed such that it comes into contact with the air entering the fuel cell and/or an exhaust gas from the fuel cell. Thus, the amount of oxidant (e.g., oxygen) consumed can be determined. The cathode stoichiometry (i.e., the ratio of the flow of oxygen supplied to the cathode and the flow of oxygen consumed by the cathode) may then be determined. A controller may be used to control operation of the fuel cell and the flow inducing device (e.g., compressor). In response to the residual amount of oxidant or cathode stoichiometry of a fuel cell being more than a (lower) threshold amount (i.e., step 215a), the operation speed of the flow inducing device/the flow rate may be maintained (i.e., step 220a). However, in response to the residual amount of oxidant or cathode stoichiometry being less than the predetermined range or the (lower) threshold amount (i.e., step 230b), the operation speed/flow rate may be increased (i.e., step 240b). Still further, in response to the residual amount of oxidant/cathode stoichiometry being more than the predetermined range or an upper threshold amount (i.e., step 225b), the operation speed/flow rate may be decreased (i.e., step 235b). In a refinement, the operation speed/flow rate may be substantially maintained (i.e., step 220a) if the residual amount of oxidant is within a predetermined range (i.e., step 215a) or adjusted (i.e., step 220b) if the residual amount of oxidant is outside a predetermined range (i.e., step 215b). Further, the residual amount of oxidant/cathode stoichiometry may be used to detect abnormalities and/or malfunctions. For example, an actual residual amount/cathode stoichiometry may be compared to an anticipated residual amount/cathode stoichiometry. If the actual measurement is different than anticipated it may indicate that there is a problem such as a faulty gasket, leak, or other malfunction. A user may be alerted so they can attend to maintenance or seek appropriate services. For example, a dashboard signal may be provided.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system comprising:
   a fuel cell defining (i) a cathode chamber housing a cathode, and (ii) an anode chamber housing an anode, the fuel cell having an electrolyte between the cathode and anode, and defining an inlet and an outlet providing fluid communication to the cathode chamber;
   a compressor configured to provide an oxidant to the cathode chamber of the fuel cell; and
   a first oxidant sensor disposed proximate to or downstream from the outlet; and
   a second oxidant sensor disposed proximate to or upstream from the inlet, wherein the first oxidant sensor and second oxidant sensor are a same type of sensor.

2. The power system of claim 1, wherein the oxidant is oxygen, and the first oxidant sensor is configured to detect a residual amount of oxygen in an exhaust gas of the fuel cell.

3. The power system of claim 1, wherein the first oxidant sensor is a first universal exhaust gas oxygen sensor.

4. The power system of claim 1, further comprising a controller configured to receive data from the first oxidant sensor and control the compressor based on the data.

5. The power system of claim 4, wherein the controller is configured to increase an operation speed of the compressor when a residual amount of oxidant defined by the data is below a first threshold amount.

6. The power system of claim 5, wherein the controller is configured to decrease the operation speed of the compressor when the residual amount of oxidant is above a second threshold amount.

7. A vehicle power system comprising:
   fuel cell having a cathode passage adjacent to a cathode, the cathode passage defining an inlet and an outlet, the cathode passage being in fluid communication with an air intake system via the inlet and an exhaust system via the outlet, the air intake system including an airflow inducing device configured to provide an airflow during operation and the exhaust system including a first oxygen sensor configured to sense a residual amount of oxygen, a second oxygen sensor configured sense an amount of oxygen provided to the fuel cell, and a bypass valve in fluid communication with the air intake system and exhaust system and configured to provide airflow to the exhaust system without passing the airflow through the fuel cell, the first oxygen sensor and second oxygen sensor being the same type of sensor; and a controller configured to initiate a command to supply oxygen to the fuel cell such that
responsive to the residual amount of oxygen being within a predetermined range, an operation speed of the airflow inducing device is maintained, and
responsive to the residual amount of oxygen being outside the predetermined range, the operation speed of the airflow inducing device is adjusted.

8. The vehicle power system of claim 7, wherein the airflow inducing device is a compressor.

9. The vehicle power system of claim 8, wherein the controller is further configured to initiate the command such that, responsive to the residual amount of oxygen being greater than the predetermined range, the operation speed of the compressor is decreased.

10. The vehicle power system of claim 9, wherein the controller is further configured to initiate the command such that, responsive to the residual amount of oxygen being less than the predetermined range, the operation speed of the compressor is increased.

11. The vehicle power system of claim 10, wherein the predetermined range is configured to maintain a cathode stoichiometry of 1.0 to 2.0.

12. The vehicle power system of claim 11, wherein the predetermined range is configured to maintain the cathode stoichiometry to 1.1 to 1.9.

13. The vehicle power system of claim 12, wherein the predetermined range is configured to maintain the cathode stoichiometry to 1.2 to 1.8.

14. A method of controlling operation of an electrochemical cell comprising:

performing a hydrogen purge or initiating a hydrogen-protective-state; and
providing an oxidant to a fuel cell, the fuel cell including an inlet and an outlet, wherein the oxidant is provided at a flow rate such that
responsive to a residual amount of oxidant in a fuel cell exhaust being more than a lower threshold amount, the flow rate is at least maintained, and
responsive to the residual amount of oxidant being less than the lower threshold amount, the flow rate is increased,
wherein the residual amount of oxidant is determined by a first sensor disposed proximate the inlet and a second sensor disposed proximate the outlet, the first and second sensors being a same type of sensor.

15. The method of claim 14, wherein responsive to the residual amount of oxidant being more than an upper threshold amount, the flow rate is decreased.

16. The method of claim 15, wherein the flow rate is increased and decreased by controlling an operation speed of a compressor.

17. The method of claim 15, wherein the lower and upper threshold amounts are configured to maintain a cathode stoichiometry of 0.95 to 1.05.

18. The method of claim 14, further comprising, responsive to the residual amount of oxidant being different than an anticipated amount, alerting a user to that operation of the electrochemical cell is abnormal.

19. The power system of claim 1, wherein the first oxidant sensor and second oxidant sensor are both universal exhaust gas oxygen (UEGO) sensors.

* * * * *